(12) United States Patent
Pillai et al.

(10) Patent No.: US 8,849,673 B2
(45) Date of Patent: Sep. 30, 2014

(54) RULE GENERATION

(75) Inventors: Vinu B. Pillai, Bangalore (IN); Mudassarabbas Syed, Bangalore (IN); Sastry Dhara, Bangalore (IN)

(73) Assignee: Tata Consultancy Services, Mumbai, IN (US)

( * ) Notice: Subject to any disclaimer, the term of this patent is extended or adjusted under 35 U.S.C. 154(b) by 616 days.

(21) Appl. No.: 13/172,154

(22) Filed: Jun. 29, 2011

(65) Prior Publication Data

US 2012/0004903 A1 Jan. 5, 2012

(30) Foreign Application Priority Data

Jul. 2, 2010 (IN) .......................... 1993/MUM/2010

(51) Int. Cl.
*G10L 15/00* (2013.01)

(52) U.S. Cl.
USPC ............................................ 704/275; 706/47

(58) Field of Classification Search
USPC .......................................................... 704/275
See application file for complete search history.

(56) References Cited

U.S. PATENT DOCUMENTS

| 4,987,538 A * | 1/1991 | Johnson et al. .................. 705/2 |
| 6,411,932 B1 * | 6/2002 | Molnar et al. ................ 704/260 |
| 2004/0230546 A1 * | 11/2004 | Rogers ............................ 706/47 |
| 2009/0144219 A1 * | 6/2009 | Zhuk ............................. 706/60 |
| 2011/0219355 A1 * | 9/2011 | Matsumoto .................. 717/106 |

* cited by examiner

*Primary Examiner* — Daniel D Abebe
(74) *Attorney, Agent, or Firm* — Lee & Hayes, PLLC

(57) ABSTRACT

A method for implementing at least one rule for an application is described. The method includes receiving an input rule. Based on the input rule, a program executable code is generated. The generated program executable code can then be associated with the application.

21 Claims, 3 Drawing Sheets

RULE GENERATION

TECHNICAL FIELD

The present subject matter relates, in general, to generating one or more rules, and in particular, to generating rules for business applications.

BACKGROUND

A number of business applications are used these days in order to provide various types of services, for example, in area s like insurance, banking, retails, etc. These business applications function on the basis of one or more decision logics, which in turn are provided by rules. Such rules can control a particular business process being implemented by the business application performing one or more tasks. In such cases, the subsequent tasks are performed only when the rules that permit ending the previous task, and those that determine that the next task should be entered, have been satisfied. Such application rules can also assist in decision-making and can have a significant impact on decision support applications. For example, a rule system can determine whether or not to extend credit to a customer, how much credit to extend, etc.

However, such decision logic can often change due to unforeseen, inevitable, or dynamic market conditions, or due to changes in the policies of an organization that uses the business application. Hence, the business applications which are based on these rules should be capable of accommodating such changes. One of the ways to accommodate such market changes in the business application is to employ a rule engine, which externalizes the rules for the application code of the business application. In such a case, the business rules can be changed without making any changes to application code of the business application.

However, conventional rule engines, generally, require the business application to be temporarily down for defining any new rules or to edit the already existing rules. Further, conventional rule engines may be complex and computationally heavy in their design and implementation, thereby rendering such defining and editing of the rules difficult and time-consuming.

SUMMARY

The subject matter described herein relates to a method for translating a rule language corresponding to at least one business rule, into an executable code and interfacing the executable code with a business application, when called by the business application. The executable code is capable of being executed directly after the translating, without any further manual compiling or interpreting.

A method for implementing at least one rule for a business application, is described. To this end, an input rule is received. Based on the input rule, a program executable code is generated. The generated program executable code can then be associated with the business application.

These and other features, aspects, and advantages of the present subject matter will be better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter.

BRIEF DESCRIPTION OF DRAWINGS

The above and other features, aspects, and advantages of the subject matter will be better understood with regard to the following description, appended claims, and accompanying drawings, where:

DETAILED DESCRIPTION

Figure 1:
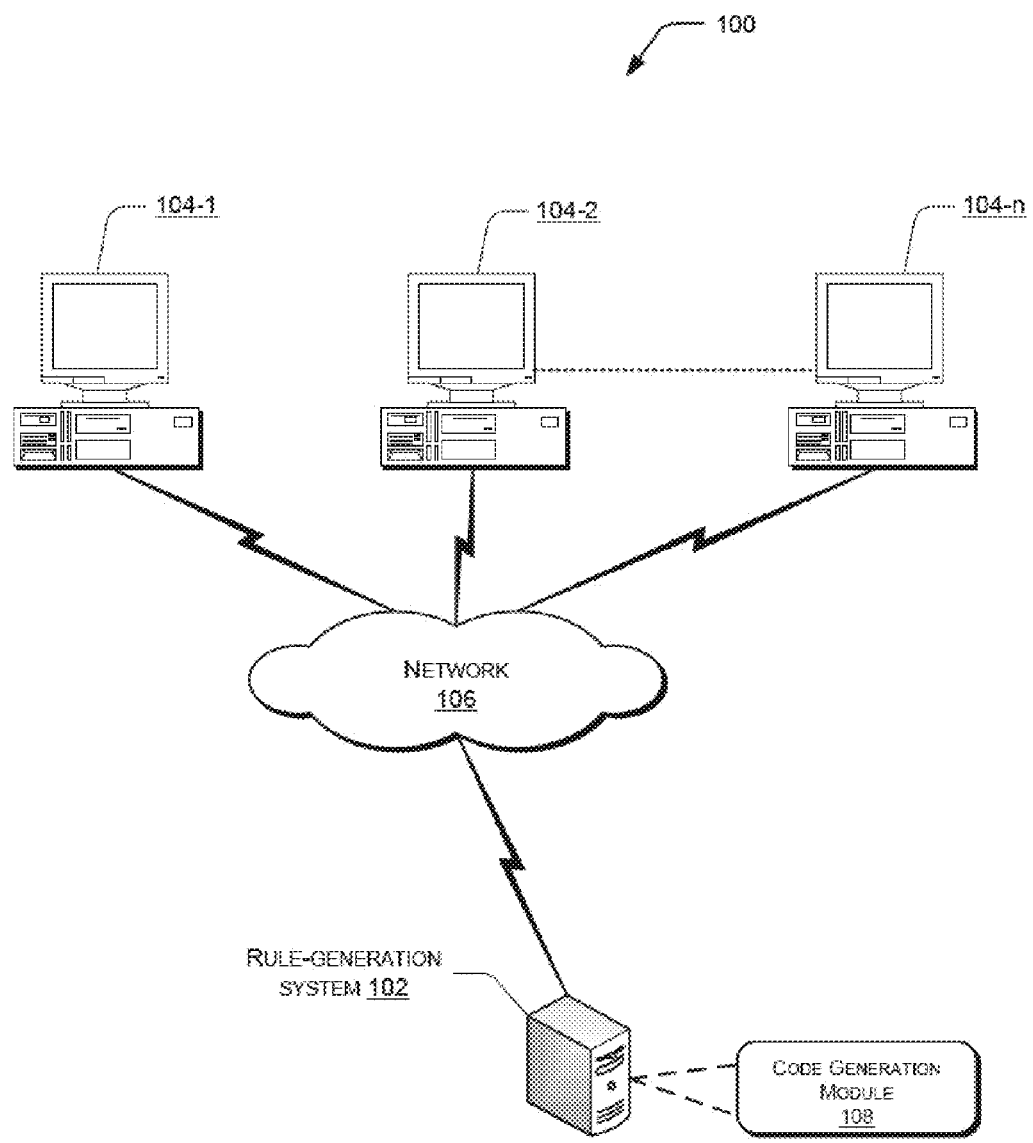
FIG. 1 illustrates an exemplary network environment implementing an exemplary rule-generation system, according to an embodiment of the present subject matter.

The present subject matter relates to a rule-generation system associated with one or more business applications which can be implemented in a business environment. A business environment can be understood as any environment within which various types of business processes may take place. Such business processes can be implemented using one or more business applications. In such business applications, various stages which form part of the business processes, can be automated or performed using one or more application rules.

In such cases, the next stage or task is performed only when the rules (interchangeably referred to as application rules), that permit ending of a previous stage and those that determine that the next stage should be initiated, have been satisfied. The application rules can also be used to implement decision-making during the execution of the business application. For example, the system implementing the rule-generation system, either alone or in combination with a system hosting the business application, can determine whether or not to process a loan application of a customer if the customer has a prior history of defaulting on payments.

The application rules are typically associated with the business application for which the rule is to be implemented. The business application is implemented as plurality of executable codes, which when executed, achieve the intended functionalities. In order to associate the application rules with the business application, one or more points of attachments within the executable code of the business application, may be identified. The rules can then be associated with the relevant points of attachment, depending on when a particular rule should be executed. For example, a rule evaluating whether a loan application is to be approved would get executed only when a code portion, say the code portion providing the credit rating of the individual is executed. The executing code portion of the business application can then subsequently place a call to the relevant rule. As will be appreciated by a person skilled in the art, depending on the requirements, a variety of rules can be associated with the business application.

As mentioned previously, the business applications are configured to implement one or more business processes. It may be the case that the business rules that are configured for such business applications may have been configured based on the practices that may have existed at the time the business application was developed. In some cases, the practices and/or policies may change with time, and thus, keeping the application rules associated with the business application updated may become difficult. In such cases, the application rules are typically associated externally with the business application in question. In such a case, changes to the application rules if required can be made without changing the code of the business application.

As mentioned previously, a rule-generation system, for example implemented as a rule engine, allows changes to the application rules resulting from a change in requirements for the business application, without making any changes to the code of the business application itself. In such a case, one or more application rules can be changed depending on the requirements of the business application. The application code communicates with the rule engine through an application programming interface (API), such as, a Java Specification Request (JSR)-94.

The application rules can be changed or modified by a user of the system, such as a system hosting the business application. In such cases, the user may include a business user who is often unaware of technical terms or programming languages in which the application rules are implemented, or can be an individual who is a technical expert in specifying the rule in a programmable technical rule language. Conventional system, however, may not allow the business user to specify such application rules in a business based vocabulary. In order to implement any changes to the application rules, the business user may typically provide inputs to a technical expert who may eventually manually code the required application rules. In scenarios where the application rules to be implemented are complex, the amount of manual coding involved may also be quite high.

Furthermore, transition between the rule based on a business vocabulary, to the rule based on technical language, and further to an executable programming language code is often not smooth and may require human intervention. For example, the technical language based code, for implementing one or more application rules, is converted to an executable code. However, in such cases the in order to generate the executable code, the technical language code needs to manually compiled or interpreted.

To this end, systems and methods are described for generation one or more application rules. In one implementation, one or more input rules can be provided, say by a business user. The input rules can be provided either as a rule based on a business vocabulary, which is in a natural language, or can define the application rules to be implemented in a technical language or a rule language.

In case the rules are specified in a business vocabulary, the specified rules are parsed and converted to a corresponding technical or rule language. Similarly, a technical expert can also in certain circumstances, may implement the application rules in a technical or rule language. The rule language includes characteristics common to some features of the business vocabulary, and to some features of the programming language code. The programming language code is the code in which the final business rules is to be implemented. Once generated, the rule language is further processed to generate a program executable code.

The program executable code can be associated with the relevant code portion of the business application. The program executable code obtained is such that it can be executed directly, when called by the application code. In one implementation, the program executable code is implemented using a programming language, such as Java. The program executable code so obtained is the implementation of the application rules required.

Once the program executable code is generated, it can be stored in a rules database in the form of code snippets and can be executed during the execution of the business application. As would be noted, the executable code, as described herein, may not require further compiling or interpreting by a user to generate a code to be executed in the business application, thereby eliminating any manual intervention by a user Since the program executable code generated is already executable, the program executable code can be associated with the business application without reinitiating the business application. Thus, the generation of the executable code is such that the executable code may be directly executed, thereby providing for zero or minimal human intervention.

Although the present subject matter has been described with reference to business applications, a similar functionality can be achieved in other applications as well, where certain actions are taken based on one or more rules.

Figure 2:
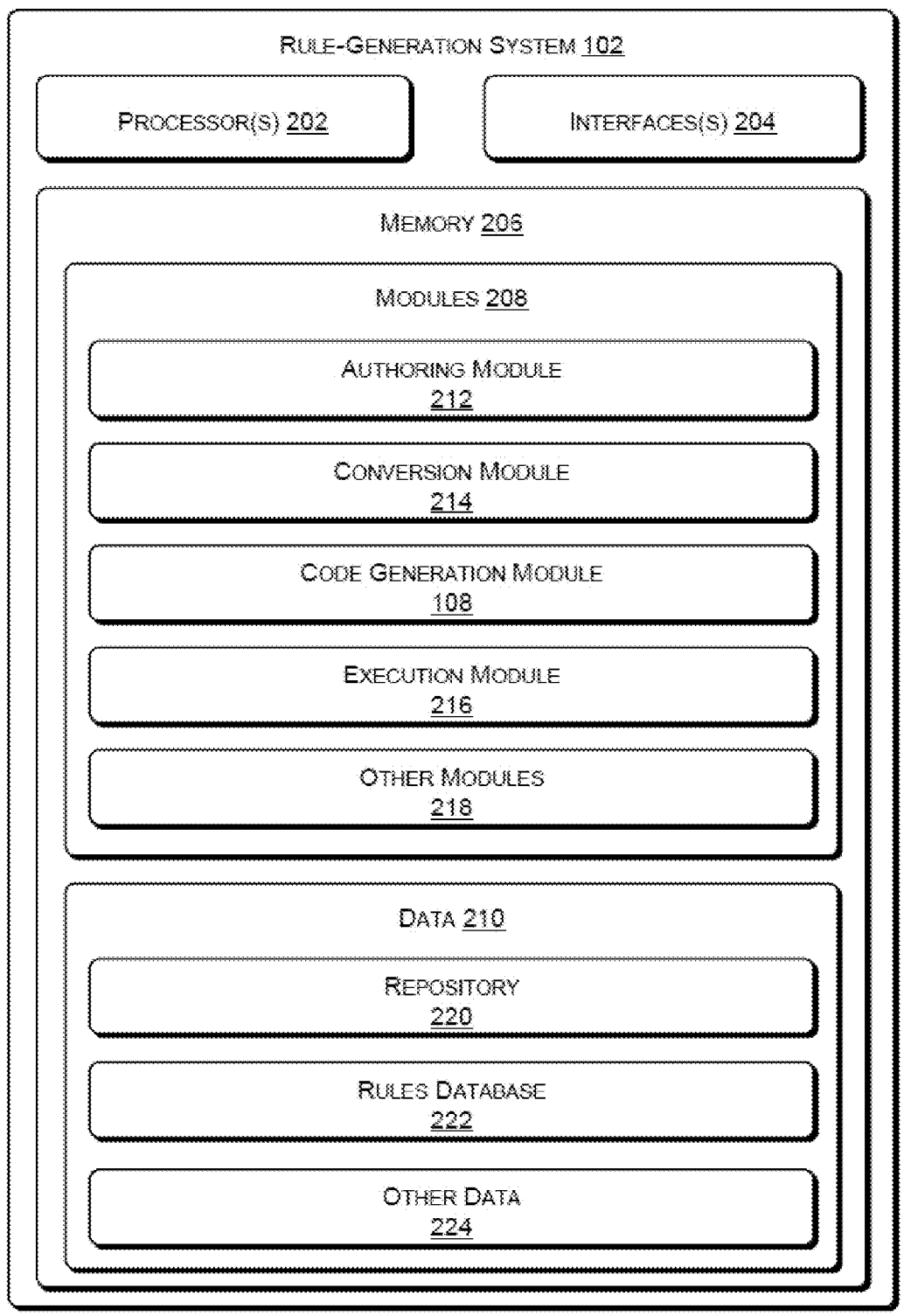
FIG. 2 illustrates exemplary components of the rule-generation system, according to an embodiment of the present subject matter.
Figure 3:
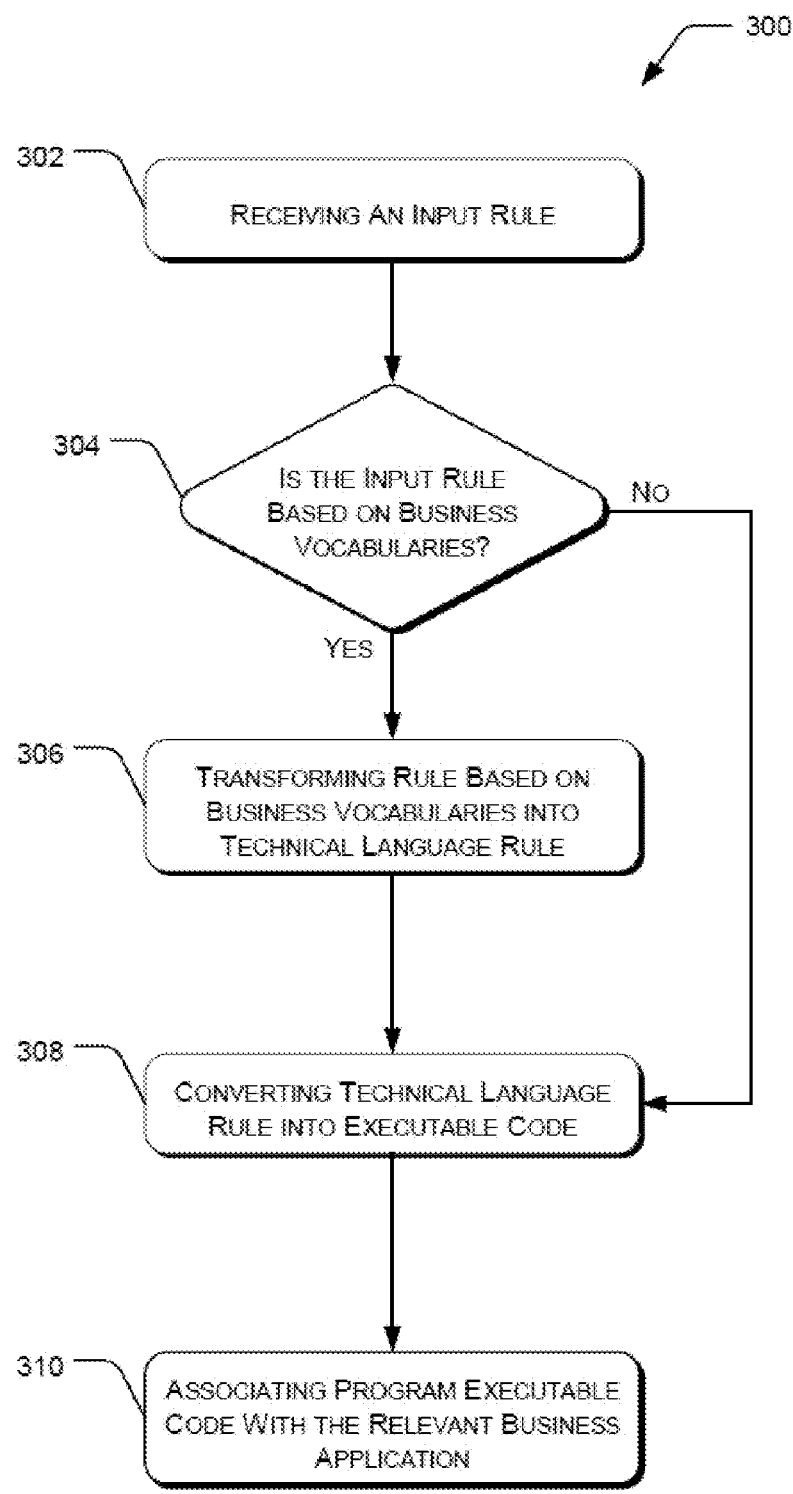
FIG. 3 illustrates an exemplary method of generating program executable code, according to an implementation of the present subject matter.

The manner in which the application rules are generated shall be explained in detail with respect to the FIGS. 1-3. While aspects of systems and methods can be implemented in any number of different computing systems, environments, and/or configurations, the embodiments are described in the context of the following exemplary system architecture(s).

FIG. 1 illustrates an exemplary network environment 100, implementing an exemplary rule engine associated with one or more business applications. The network environment 100 includes an rule-generation system 102 communicating with client devices 104-1, 2 . . . , n (collectively referred to as client devices 104). The rule-generation system 102 communicates with one or more of the client devices 104 over the network 106.

The network 106 may be a wireless network, wired network or a combination thereof. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other.

The rule-generation system 102 and the client devices 104-1, 104-2, . . . , 104-n may be implemented as mainframes, personal computers, laptops, personal digital assistants (PDAs), etc. The rule-generation system 102 generates one or more application rules for the business applications. In one implementation, the rule-generation system 102 can be implemented on the same computing device that is also hosting a business application for which the application rules are generated. For example, the rule-generation system 102 can be hosted, along with the relevant business application, on an application server.

In one implementation, the rule-generation system 102 includes a code generation module 108 for generating one or more business rules. In order to implement one or more application rules for business applications, an input rule is received by the rule-generation system 102. The input rule forms the basis on which the rule to be implemented is generated. The input rule can be specified either as a business rule, i.e., in business vocabulary, or can be specified as a technical rule, i.e., in technical rule language. In one implementation, the input rule can be provided based on input provided by one or more users, through one or more of the client devices 104.

The input rule specified as a business rule can be typically based on commonly known business vocabularies. Such business vocabularies can be added, modified, or deleted, depending on the usage of business terminologies. It would be appreciated that the input rules based on the business vocabularies enable non-technical personnel to author required application rules, depending on the requirements. In one implementation, the rule based on the business vocabularies can be implemented as simple if-then statements. An example of an input rule based on a business vocabulary is shown below:

IF

The agent level is equal to Group Agency Manager and The Chargeable Amount is greater than 50000 and The Chargeable Amount is less than 75000

THEN

The computed commission is The Chargeable Amount*1.0/100;

The above example provides a rule for computing a commission value based on the variable—the chargeable amount. As can be seen from the above example, the application rule as provided above only executes if the variable chargeable amount lies between one or more predefined values.

Once received, the input rules are processed by the rule-generation system 102. In one implementation, the input rule, which is based on the business vocabularies, is further converted to a technical rule language. In another implementation, the conversion of the rule based on business vocabularies is converted to the technical rule language based on a regular expression parser known in the art.

In another implementation, the input rule can be received by the rule-generation system 102 as a technical language rule. The technical language rule can be specified by technical expert, say through one or more of the client devices 104. An exemplary technical rule language, as per one implementation of the present subject matter is provided below:

IF

CalculateChargeMO[agentLevel] is equal to Domain [D_RESPONSIBILITY_GROUP_AGENCY_MANAGER] and CalculateChargeMO[chargeableAmount] is greater than 50000 and

CalculateChargeMO[chargeableAmount] is less than 75000

THEN

CalculateCharge*MO*[computedCommission:BigDecimal] =CalculateCharge*MO*[chargeableAmount]*1.0/100;

The above technical language rule can either be received from a technical expert, say through one or more of the client devices 104, or can be generated from the input rule based on business vocabularies. The present example of the technical language rule as shown above can be generated by converting the example of the input rule based on business vocabularies, as previously illustrated.

Once the technical language rule is obtained, either from converting a rule based on business vocabularies, or as received from a technical expert, the code generation module 108 converts the technical language rule into a program executable code. The program executable code so generated can be based on a programming language. An example of such a programming language includes, but is not limited to, Java. The program executable code so generated is an executable format and does not require any further interpretation or compilation. In one implementation, the program executable code can be stored in an external database (not shown in the figure).

In one implementation, the conversion of the technical language rule to generate the program executable code is implemented using an ANTLR (Another Tool for Language Recognition) based parser. The program executable code so generated can be associated with a specific portion of the application code. When the portion of the application code executes, the associated program executable code is called and executed.

It will be understood that the foregoing description has been provided with respect to a single rule-generation system 102. However, the similar concept would also be applicable in a network having multiple rule-generation systems 102 which may further be associated with one or more business applications. It would also be appreciated that the rule generation has been described in context of Java. The scope of the present subject matter, however, would also be applicable to other programming language platforms. These and other aspects would be described in detail in conjunction with the description of FIG. 2-3.

FIG. 2 illustrates exemplary components of the rule-generation system 102, in accordance with an embodiment of the present subject matter. In said embodiment, the rule-generation system 102 includes one or more processor(s) 202, input-output (I/O) interface(s) 204, and a memory 206. The processor 202 may be implemented as one or more microprocessors, microcomputers, microcontrollers, digital signal processors, central processing units, state machines, logic circuitries, and/or any devices that manipulate signals based on operational instructions. Among other capabilities, the processor 202 is configured to fetch and execute computer-readable instructions stored in the memory 206.

The I/O interface(s) 204 may include a variety of software and hardware interfaces, for example, a web interface allowing the rule-generation system 102 to interact with the client devices 104. Further, the I/O interfaces 204 may enable the rule-generation system 102 to communicate with other computing devices, such as web servers and external repositories. The I/O interfaces 204 can facilitate multiple communications within a wide variety of networks and protocol types, including wired networks, for example Local Area Network (LAN), cable, etc., and wireless networks such as Wireless LAN (WLAN), cellular, or satellite. The I/O interfaces 204 may include one or more ports for connecting a number of computing devices to each other or to another server.

The memory 206 may can be implemented as any computer-readable medium known in the art including, for example, volatile memory (e.g., RAM) and/or non-volatile memory (e.g., flash, etc.). In one implementation, the memory 206 includes module(s) 208 and data 210. In an embodiment, the module(s) 208 include an authoring module 212, a conversion module 214, the code generation module 108, an execution module 216, and other modules 218. The data 210 serves, amongst other things, as a repository for storing data processed, received and generated by one or more of the module(s) 208. In one implementation, the data 210 include repository 220, rules database 222, and other data 224.

As indicated previously, the process of rule generation is based on one or more input rule that may either be provided as rules based on business vocabularies, or as technical language rule. In one implementation, the input rule can be based on a authoring stage implemented, for example, by the pre-authoring module 212. The authoring module 212 implements authoring based on one or more objects that interact with each other in an application area. Examples of an application area include, but are not limited to, business related fields such as banking, insurance, security trading, and such.

It would be appreciated that every application area has a predefined set of objects. For example, in the application area related to the banking industry, would include objects that define various attributes of customers. The objects are chosen based on the functionality that is sought to be implemented. Returning to the example of the rule based on business vocabularies, as provided previously, provides for chargeable amount object based on which the commission, as indicated by the commission object, is computed. In one implementation, the objects can be specified along with their relevant constant values. The constant values, also known as domain values, can be based on the requirements of the application area.

The application area can be defined by the business user and the technical expert, either alone or in combination. Once the application area is defined, one or more rule sets are provided the application area. The rule set includes a plurality of rules that can be used to implement the functionality which is required. In one implementation, the predefined objects (i.e., facts) and the rule set can be stored in other data 224.

In another implementation, any additional functions can be specified along with the application area and the objects that operate within the application area. Once specified, the authoring module 212 maps the application area, the objects, and the functions (if any) to one or more business vocabularies. Based on the mapping, the input rules can be authored. In one implementation, the input rules can be authored by the technical user or the business user. The input rule so generated is based on one or more business vocabularies. In one implementation, the repository 220 stores the business vocabulary related to different application areas to which the objects are mapped by the authoring module 212.

Once the input rule, based on the business vocabularies, is received, the conversion module 214 converts the input rule based on business vocabularies, to technical language rules. In one implementation, the conversion module 214 converts the input rule based on the business vocabularies using parsing techniques based on a regular expression parser.

In another implementation, the conversion module 214 matches the strings in the text of the business vocabulary to a predefined set of instructions in the technical language. Based on the matching, the conversion module 214 generates the technical language rule.

The code generation module 108, as described in FIG. 1, is configured to translate the technical language rule into a program executable code. As described above, the technical language rule can be received from technical experts, say through one or more of the client devices 104, or can be obtained by converting the rule based on the business vocabularies to the technical language rule. The code generation module 108 on generating stores the program executable code in rules database 222. In an embodiment, the program executable code can be stored in the form of code snippets based on a programming language, such as, java. In another implementation, the code snippets stored in the rules database 222 can be used to revert back to previously implemented rules that were associated with the business applications. In another implementation, the rules database 222 can be implemented as an external database.

In an implementation, the code generation module 108 converts the technical language rule to program executable code in a series of intermediate steps. For example, the code generation module 108 initially performs lexical analysis of the technical language rule. While performing the lexical analysis, the code generation module 108 identifies one or more keywords and matches the keywords with predefined lexer rules, which can be written using a context free grammar, such as, Extended Backus-Naur Form (EBNF). In case, the keywords don't match with any lexer rule, the predefined lexer rule under consideration is discarded. If the input rule does not match the parser rule under consideration, it is discarded. If, however, the input rule matches the parser rule, an Abstract Syntax Tree (AST) is created. In one implementation, the AST is created by the conversion module 214. The AST can be considered to be a representation of the parsed input for processing, say by the code generation module 108.

Once the AST is obtained, the conversion module 214 using tree parser rules, parses through the obtained AST. Once parsed, the code generation module 108 generates the program executable code. The code generation module 108 can generate the program executable code either directly or based on a certain template. In one implementation, the tree parser rules can be based on EBNF grammar Once obtained, the execution module 216 associates the program executable code with the business application. In one implementation, the execution module 216 associates the program executable code with the business application based on JSR-94 API. The execution module 216 then subsequently executes the program executable code, for example, the code snippets as generated by the code generation module 108. The result of the execution can be displayed at the client device 104. In one implementation, the execution module 216 associates the program executable code with the business application. During the execution of the code corresponding to the business application, one or more rules would be called depending on the code portion being executed. When the relevant rule is called, the corresponding program executable gets executed.

FIG. 3 illustrates an exemplary method 300 for executing the business application according to an implementation of the present subject matter. In one implementation, the application rule are generated and executed by a rule-generation system 102. The application rules can be defined or edited by a business user or a technical user.

The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof.

At block 302, an input rule based on which an application rule is to be generated, is received. For example, the code generation module 108 receives the input rule. The input rule can be specified either as a business rule, i.e., in business vocabulary, or can be specified as a technical rule, i.e., in technical rule language. In one implementation, the input rule can be provided based on input provided by one or more users, through one or more of the client devices 104.

At block 304, it is determined whether the input rule received, is a business rule, i.e., a rule based on business vocabularies, or a technical language rule. If it is determined that the input rule is a technical language rule ('No' path from block 304), the control proceeds to block 308.

If however it is determined that the received input rule is a business rule, i.e., a rule based on business vocabularies ('Yes' path from block 304), the received input rule is converted to a technical language rule (block 306). For example, the conversion module 214 converts the input rule based on business vocabularies, to technical language rules. In one implementation, the conversion module 214 converts the input rule based on the business vocabularies using parsing techniques based on a regular expression parser. The method proceeds to block 308.

At block 308, the technical language rule is converted into a program executable code. For example, code generation module 108 translates the technical language rule into a program executable code. As described above in conjunction with FIG. 2, the technical language rule can be received from technical experts (such as from block 302, 304), or can be obtained by converting the rule based on the business vocabularies to the technical language rule (from block 306). In one implementation, the code generation module 108 further lexically analyzes the technical language rule to generate the program executable code.

At block 310, the program executable code is associated with a business application. For example, the code generation module 108 associates the program executable code with the business application. In one implementation, the code generation module 108 associates the program executable code with the business application based on JSR-94 API. Once the program executable code is associated with the business application, the execution module 216 then subsequently executes the program executable code, for example, the code snippets as generated by the code generation module 108.

Although embodiments for rule generation have been described in language specific to structural features and/or methods, it is to be understood that the invention is not necessarily limited to the specific features or methods described. Rather, the specific features and methods are disclosed as exemplary implementations for rule generation.

We claim:

1. A method for implementing at least one rule for an application, the method comprising:
   receiving an input rule;
   generating a program executable code based at least in part on the received input rule, the received input rule being a rule based on business vocabularies, wherein the generating the program executable code is based on:
      identifying one or more objects related to an application area associated with the application, and
      mapping the identified one or more objects to the business vocabularies to generate the rule based on the business vocabularies; and
   associating the program executable code with the application.

2. The method as claimed in claim 1, wherein the input rule is a technical language rule.

3. The method as claimed in claim 1, wherein the generating further comprises transforming the rule based on the business vocabularies into at least one technical language rule.

4. The method as claimed in claim 3, wherein the transforming is based at least on a regular expression parsing technique.

5. The method as claimed in claim 3, further comprises converting the technical language rule to the program executable code.

6. The method as claimed in claim 1, wherein the associating comprises:
   identifying at least one point of attachment in a code portion of the application; and
   attaching the program executable code to the identified point of attachment.

7. The method as claimed in claim 1, wherein the associating is based on JSR-94 application programming interface.

8. A system for generating rules for an application, the system comprising:
   a processor; and
   a memory coupled to the processor, wherein the memory comprises:
   a code generation module configured to generate a program executable code based at least in part on an input rule, the input rule being rule based on business vocabularies, wherein the code generation module generates the program executable code by:
      identifying one or more objects related to an application area, and
      mapping the identified one or more objects to business vocabularies to generate the rule based on the business vocabularies.

9. The system as claimed in claim 8, wherein the input rule is based on a technical language rule.

10. The system as claimed in claim 8, further comprising a conversion module configured to transform the rule based on the business vocabularies to at least the technical language rule.

11. The system as claimed in claim 9, wherein the code generation module is configured to convert the technical language rule to the program executable code.

12. The system as claimed in claim 8, wherein the code generation module includes an ANTLR (Another Tool for Language Recognition) based parser.

13. The system as claimed in claim 9, wherein the code generation module is further configured to perform a lexical based analysis of the technical language rule to identify at least one key word.

14. The system as claimed in claim 8, wherein the code generation module is further configured to:
   associate the program executable code with the application; and
   execute the program executable code based at least in part on the execution of the application.

15. A non-transitory computer-readable medium having embodied thereon a computer program for executing a method comprising:
   receiving an input rule;
   generating a program executable code based at least in part on the received input rule, the received input rule being a rule based on business vocabularies, wherein the generating the program executable code is based on:
      identifying one or more objects related to an application area, and
      mapping the identified one or more objects to business vocabularies to generate the rule based on the business vocabularies; and
   associating the program executable code with the application.

16. The non-transitory computer readable medium as claimed in claim 15, wherein the input rule is based on a technical language rule.

17. The non-transitory computer readable medium as claimed in claim 15, wherein the generating further comprises transforming the rule based on the business vocabularies into at least one technical language rule.

18. The non-transitory computer readable medium as claimed in claim 15, wherein the associating comprises:
   identifying at least one point of attachment in a code portion of the application; and
   attaching the program executable code to the identified point of attachment.

19. A method for implementing at least one rule for an application, the method comprising:
   receiving an input rule;
   generating a program executable code based at least in part on the received input rule; and
   associating the program executable code with the application, the associating comprising:
      identifying at least one point of attachment in a code portion of the application; and
      attaching the program executable code to the identified point of attachment.

20. A method for implementing at least one rule for an application, the method comprising:
   receiving an input rule;
   generating a program executable code based at least in part on the received input rule; and
   associating the program executable code with the application, the associating being based on JSR-94 application programming interface.

21. A non-transitory computer-readable medium having embodied thereon a computer program for executing a method comprising:
   receiving an input rule;
   generating a program executable code based at least in part on the received input rule; and
   associating the program executable code with the application, the associating comprising:
      identifying at least one point of attachment in a code portion of the application; and
      attaching the program executable code to the identified point of attachment.

* * * * *